(12) United States Patent
Yoshino

(10) Patent No.: US 7,633,672 B2
(45) Date of Patent: Dec. 15, 2009

(54) WAVELENGTH CONVERSION DEVICES

(75) Inventor: Takashi Yoshino, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/038,208

(22) Filed: Feb. 27, 2008

(65) Prior Publication Data

US 2008/0218847 A1 Sep. 11, 2008

(30) Foreign Application Priority Data

Mar. 8, 2007 (JP) .............................. 2007-058369

(51) Int. Cl.
*G02F 2/02* (2006.01)
(52) U.S. Cl. .................. 359/326; 359/332; 385/122; 385/132
(58) Field of Classification Search ......... 359/326–332; 385/122, 129–132
See application file for complete search history.

(56) References Cited

U.S. PATENT DOCUMENTS

| | | | |
|---|---|---|---|
| 5,138,687 A | 8/1992 | Horie et al. | |
| 5,434,700 A * | 7/1995 | Yoo | 359/332 |
| 5,652,674 A | 7/1997 | Mizuuchi et al. | |
| 5,991,489 A | 11/1999 | Kondo | |
| 6,687,448 B2 * | 2/2004 | Iwai et al. | 385/132 |
| 2001/0055453 A1 * | 12/2001 | Mizuuchi et al. | 385/122 |
| 2007/0189689 A1 | 8/2007 | Yamaguchi et al. | |

FOREIGN PATENT DOCUMENTS

| | | |
|---|---|---|
| JP | 3-110505 | 5/1991 |
| JP | 08-220578 A1 | 8/1996 |
| JP | 10-239544 | 9/1998 |
| JP | 2004-045536 | 2/2004 |
| JP | 2005-070194 A1 | 3/2005 |
| JP | 2005-070195 A1 | 3/2005 |
| WO | 2006-041172 | 4/2006 |

OTHER PUBLICATIONS

U.S. Appl. No. 12/034,820, filed Feb. 21, 2008, Yoshino.

* cited by examiner

*Primary Examiner*—Hemang Sanghavi
(74) *Attorney, Agent, or Firm*—Burr & Brown

(57) ABSTRACT

A wavelength conversion device is provided having a ridge optical waveguide and a periodic domain inversion structure formed in the waveguide. The optical waveguide has side wall faces, an upper face and edge areas formed between the upper face and the side wall face, respectively. R-faces are formed on the edge areas.

2 Claims, 3 Drawing Sheets

Fig. 3
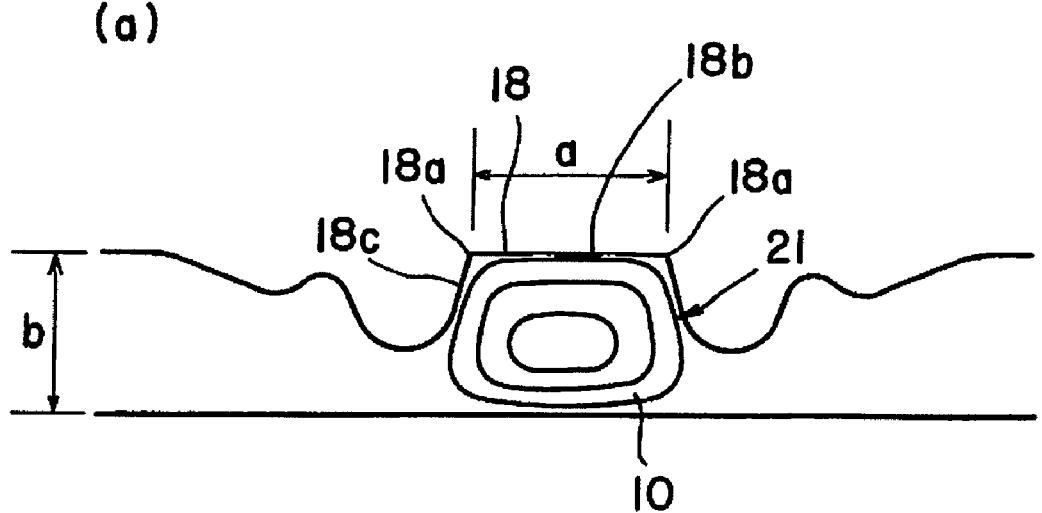
(a)
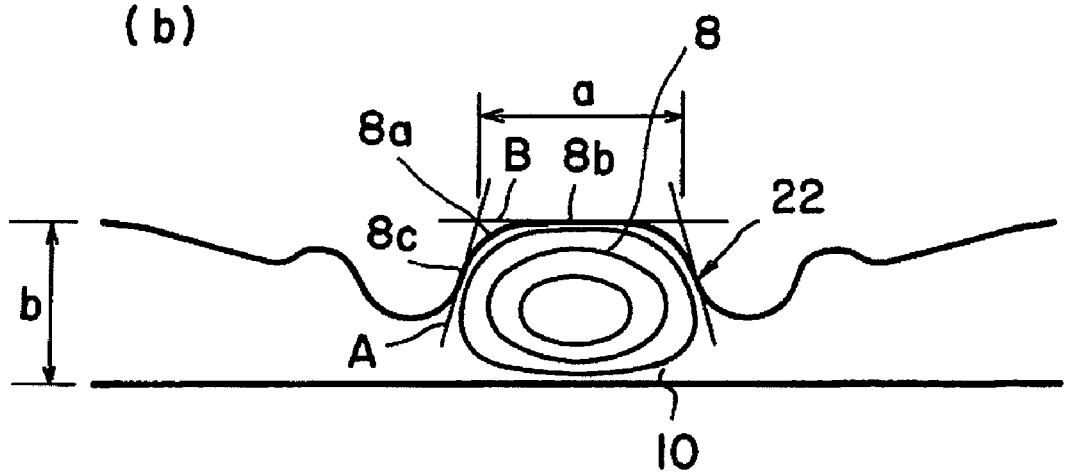
(b)

WAVELENGTH CONVERSION DEVICES

This application claims the benefit of Japanese Patent Application P 2007-58369 filed on Mar. 8, 2007, the entirety of which is incorporated by reference.

BACKGROUND OF THE INVENTION

1. Field of the Invention

The present invention relates to a wavelength conversion device.

2. Related Art

An optical frequency modulator utilizing the surface acoustic wave, an optical wavelength conversion device utilizing the polarization inversion of non-linear domain and so forth can be realized by periodically forming the domain inversion structure wherein the ferroelectric polarization is forcibly inverted. Especially, if the periodic domain inversion of non-linear optical materials becomes possible, a high-efficiency wavelength conversion device can be manufactured; and to convert a solid state laser beam, for example, by using the above wavelength conversion device will make it possible to build up a small and light short-wavelength light source, which can be applied to printing, optical information processing, optical application measurements and controls and so forth.

As the method of forming a periodic domain inversion structure in a ferroelectric non-linear optical material, the so-called electric field poling process has been generally known. This method forms a comb-shaped electrode on one principal plane of a ferroelectric single crystal substrate and a uniform electrode on the other principal plane, and applies a pulse voltage between these electrodes. This sort of method is disclosed in Japanese Patent Publication No. H8-220578A, Japanese Patent Publication No. 2005-70195A and Japanese Patent Publication No. 2005-70194A.

Generation of the second harmonics from a non-linear optical material such as lithium niobate single crystal needs to form the periodic domain inversion in the single crystal. And, after forming the periodic domain inversion structure in the ferroelectric single crystal substrate, the method forms a ridge channel optical waveguide onto the surface of the substrate by means of machine processing or laser processing. Here, to locate the periodic domain inversion structure inside the ridge optical waveguide will modulate fundamental wave incident onto the optical waveguide to higher harmonics.

SUMMARY OF THE INVENTION

However, in the case of forming the ridge optical waveguide in the area where the periodic domain inversion structure is formed and making the fundamental wave incident onto the waveguide, the coupling efficiency to, for example, an optical fiber outside the device decreased in many cases; and a tendency was observed which increased the propagation loss of light. This reduces the higher harmonics output, which has been ascertained. This is a phenomenon not been observed when the periodic domain inversion structure is used as a slab waveguide; and it has been beyond conventional estimation.

The present invention intends to enhance the generation efficiency of higher harmonics, when forming a wavelength conversion device having a ridge optical waveguide wherein the periodic domain inversion structure is formed.

The present invention provides a wavelength conversion device comprising a ridge optical waveguide and a periodic domain inversion structure formed in the optical waveguide. The ridge optical waveguide has side wall faces and a upper face, and R-faces are formed on edge areas between the side wall faces and the upper surface of the waveguide.

The inventors have paid attention to the shape of the ridge area, when making a ridge waveguide-type wavelength conversion device. And the inventors confirmed that the ridge area becomes trapezoid in processing the ridge area and the waveguide mode becomes trapezoid and distorted. The inventors found that this asymmetry distorted propagating mode becomes a cause of deteriorating the coupling efficiency and increasing the propagation loss.

Based on this novel knowledge, the inventors reached the idea of, after forming a ridge area, polishing the surface of the ridge area, particularly the edge areas by a soft polishing pad to process the edge areas into R-faces. When confirming the propagating mode in the ridge optical waveguide after polishing, the inventors found that the shape of the propagating mode was improved into a highly symmetrical shape. As the result, the inventors confirmed that the higher harmonic output was remarkably enhanced in comparison to the case before the R-faces were formed. The present invention was thus made.

BRIEF DESCRIPTION OF THE DRAWINGS

FIG. 1(a) is a schematic drawing illustrating a wavelength conversion device 1 relating to one embodiment of the present invention, and FIG. 1(b) is an expanded drawing of an edge area 8a.

FIG. 3(a) is a schematic drawing illustrating a propagating mode in the ridge optical waveguide of the comparison example, and FIG. 3(b) is a schematic drawing illustrating a propagating mode in the ridge optical waveguide of the embodiment of the present invention.

DETAILED DESCRIPTION OF THE INVENTION

The present invention will be described in detail with reference to the appended drawings.

FIG. 1(a) is the schematic drawing illustrating the wavelength conversion device 1 relating to one embodiment of the present invention, and FIG. 1(b) is the expanded drawing of the edge area 8a of the ridge optical waveguide 8. FIG. 2 is the schematic drawing illustrating the wavelength conversion device 11 relating to the comparison example.

Figure 1:
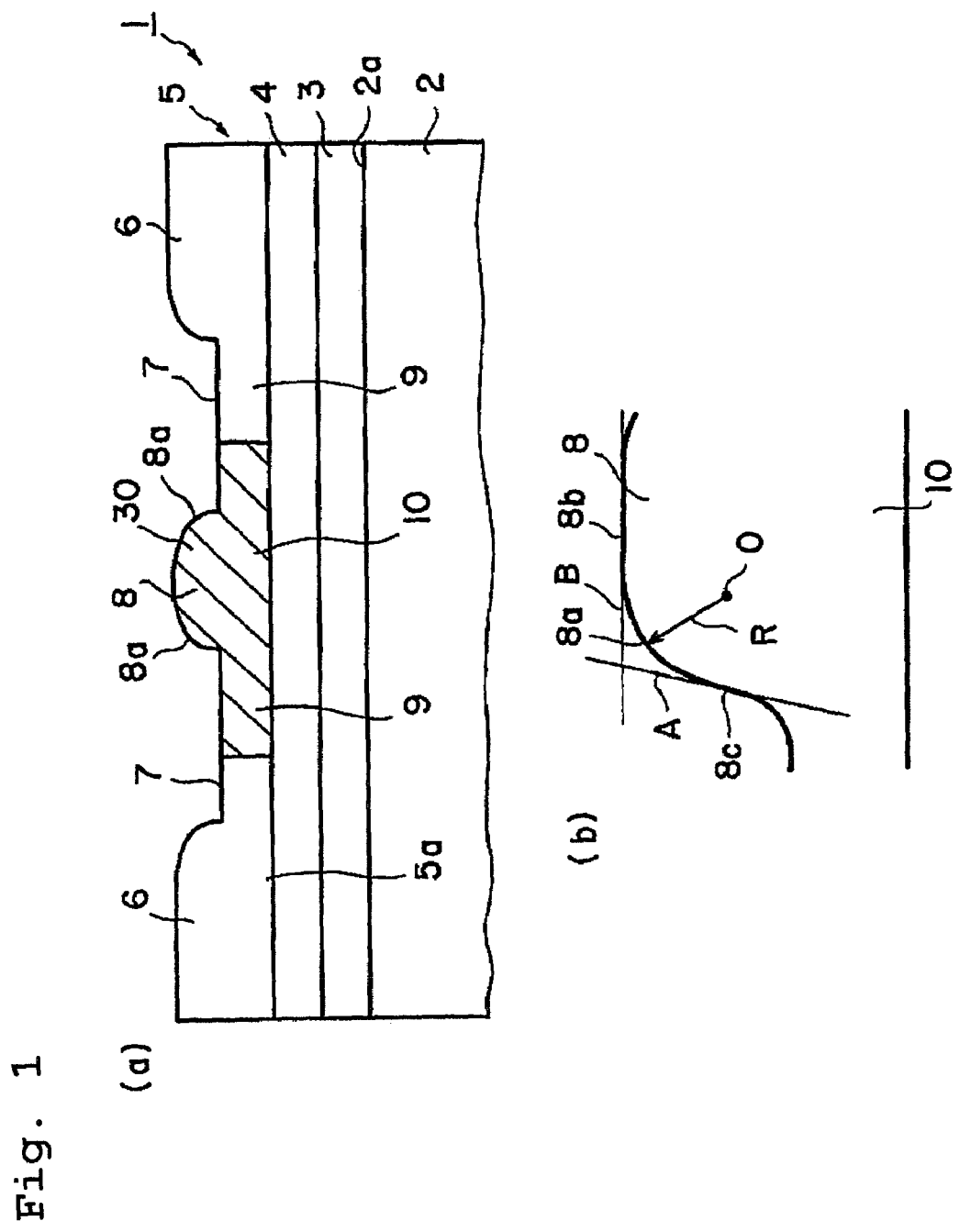
Figure 2:
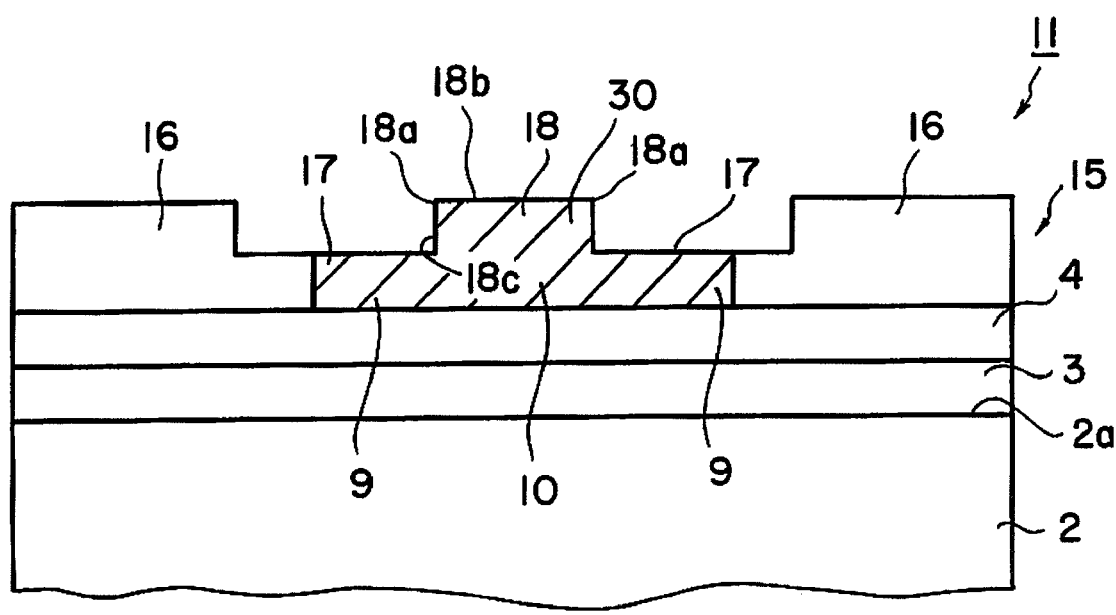
FIG. 2 is a schematic drawing illustrating a wavelength conversion device 11 relating to a comparison example.

In the wavelength conversion device 1 in FIG. 1, a buffer layer 4 is formed on a back face 5a of an optical waveguide substrate 5. The buffer layer 4 of the optical waveguide substrate 5 is bonded to a surface 2a of a supporting substrate 2 by an adhesive layer 3. The surface of the optical waveguide substrate 5 is processed, which includes a ridge optical waveguide 8, grooves 7 located on both sides of the ridge optical waveguide 8, and extended areas 6 formed outside of the grooves 7. The symbol 9 denotes thinner thickness areas, and the symbol 10 denotes the bottom of the ridge optical waveguide 8. Edge areas 8a are provided on the boundaries of an upper face 8b and side wall faces 8c of the ridge optical waveguide 8. A periodic domain inversion structure 30 is provided inside the ridge optical waveguide 8.

In the device 11 in FIG. 2, the buffer layer 4 is formed on the back face of an optical waveguide substrate 15. The buffer layer 4 of the optical waveguide substrate 15 is bonded to the surface 2a of the supporting substrate 2 by the adhesive layer 3. The surface of the optical waveguide substrate 15 is processed, which includes a ridge optical waveguide 18, grooves 17 located on both sides of the ridge optical waveguide 18, and extended areas 16 formed outside of the grooves 17. The symbol 9 denotes thinner thickness areas, and the symbol 10 denotes the bottom of the ridge optical waveguide 18. Edge areas 18a are provided on the boundaries of an upper face 18b and side faces 18c of the ridge optical waveguide 18.

Now, in the conventional wavelength conversion device, especially the R-face processing was not applied to the edge areas 18a of the ridge optical waveguide 18. The ridge optical waveguide 18 can be formed by laser processing or etching; however the processing is difficult, and the shape after processing becomes trapezoid inevitably. As shown in FIG. 3(a), for example, a ridge width "a" of the upper surface 18b of the ridge optical waveguide 18 becomes smaller than the width of the bottom of the ridge optical waveguide 18, and the side wall surfaces 18c are inclined.

It was confirmed that a light beam 10 propagating inside the ridge optical waveguide 18 is apt to be greatly distorted. An asymmetrically distorted propagating mode can be a cause of the deterioration of the coupling efficiency and the increase of the propagation loss.

In contrast to this, the present invention forms the R-faces on the edge areas 8a of the ridge optical waveguide 8, as shown in FIG. 1(b). As the result, it was found that the shape of a propagating mode 22 was improved into a highly symmetrical shape, as shown in FIG. 3(b). And in consequence, it was confirmed that the higher harmonic output was remarkably enhanced in comparison to the case before forming the R-faces.

When the edge areas of the ridge optical waveguide were formed into C-faces, a good result like the present invention was not acquired. In other words, the essential point of the present invention lies in that not simply chamfering the edge areas but selecting only R-faces changes the shape of the propagating mode to contribute to the increase of a higher harmonic output.

While the R-faces are formed on the edge areas 8a, the curvature radius of the R-faces is not confined. However, in view of the function and effect of the present invention, the curvature radius R at the R-faces is 0.7 µm or more, and is further preferably 1.0 µm or more.

The upper limit of the curvature radius R of the R-faces is not particularly specified; however, it is practically preferable to be equal to or below ½ of the ridge width "a" of the ridge optical waveguide, and is further preferably equal to or below ⅖ of the ridge width "a" of the ridge optical waveguide. Here, the ridge width "a" of the ridge optical waveguide is defined as follows. The tangential lines on the side wall surfaces 8c are represented by "A", and the tangential line on the upper surface 8b is represented by "B". The distance between the intersecting points of the tangential lines A and tangential line B is defined as the ridge width "a".

Although the ridge width "a" is not especially confined, it is preferably 3.0 to 6.0 µm in view of the present invention, and is further preferably 4.0 to 5.0 µm. The height b of the ridge is not especially confined, however it is preferably 0.5 to 3.0 µm, and is further preferably 1.5 to 2.5 µm.

The method of processing the ridge area to form the R-faces is not especially confined; however the following methods can be cited.

Surface polishing by a soft polishing pad and colloidal silica.

Etching by Nitrate Fluoride

The material of the optical waveguide substrate is not especially confined; however, a ferroelectric single crystal is preferable, and single crystals of lithium niobate ($LiNbO_3$), lithium tantalate ($LiTaO_3$), lithium niobate-lithium tantalate solid solution, and $K_3Li_2Nb_5O_{15}$ are particularly preferable.

In order to further enhance the optical damage resistance of the three-dimensional optical waveguide, one or more types of metal elements selected from the following group can be contained into the ferroelectric single crystal: magnesium (Mg), zinc (Zn), scandium (Sc) and indium (In). And magnesium is most preferable among them. From the view that the domain inversion characteristic (condition) is made clear, particularly preferable is one wherein magnesium is added to each of lithium niobate single crystal, lithium niobate-lithium tantalate solid solution single crystal, and lithium tantalate single crystal.

And rare earth elements can be contained as a dopant into the ferroelectric single crystal. The rare earth elements here function as additive elements for laser oscillation.

As the rare earth elements, neodymium (Nd), erbium (Er), thulium (Tm), holmium (Ho), dysprosium (Dy) and praseodymium (Pr) are particularly preferable.

As the optical waveguide substrate, it is especially preferable to use the so-called Z cut substrate, off-cut X substrate or off-cut Y substrate. In case of using the off-cut X substrate or off-cut Y substrate, the off-cut angle is not especially confined. Especially preferable off-cut angle is 1 degree to 20 degrees.

The material of the supporting substrate is needed to have high insulation properties, uniform volume resistivity in the material, and required mechanical strength. As the above material, the following can be listed:: silicon, sapphire, quartz, glass, lithium niobate, lithium tantalate, lithium niobate-lithium tantalate solid solution, MgO doped lithium niobate, MgO doped lithium tantalate, ZnO doped lithium niobate, and ZnO doped lithium tantalate.

The material of the adhesive for bonding the optical waveguide substrate and the supporting substrate is not especially confined; however, ultraviolet curing, thermosetting, and combined type such as acrylic or epoxy resins can be cited.

The method of forming the ridge optical waveguide is not especially confined. The ridge optical waveguide can be formed, for example, by laser abrasion, grinding, dry etching, and wet etching.

The periodic domain inversion structure formed by the present invention can be applied to any optical device having such a domain inversion structure. Such an optical device includes a higher harmonic generation device, for example, a second higher harmonic generation device. In case of using the device as the second higher harmonic generation element, the wavelength of the higher harmonics is preferably 330 to 1600 nm.

EXAMPLES

The wavelength conversion device 1 illustrated in FIG. 1 was manufactured. Concretely, a comb-shaped periodic electrode with the period of 6.53 µm was formed on an MgO 5% doped lithium niobate-5 degree off-cut Y substrate of 0.5 mm thick, by photolithography. An electrode membrane was formed over the entire surface of the back face of the substrate; thereafter, a pulse voltage was applied to form a periodic domain inversion structure. After forming the periodic domain inversion, a $SiO_2$ under clad 4 of 0.6 µm thick was formed by the sputtering.

An adhesive was applied to a non-doped lithium niobate substrate 2 of 0.5 mm thick, to which was stuck the above MgO doped lithium niobate substrate. The surface of the MgO doped lithium niobate substrate was abraded and polished until the thickness thereof reached 3.8 µm.

Next, a ridge waveguide was formed by the laser abrasion, in a manner that the center of the waveguide is located 10 µm distant from the front end of the periodic domain inversion area. The width "a" of the ridge area formed was 4.5 µm, and the height b of the ridge area was 2 µm. After forming the ridge area, the surface thereof was polished for five minutes by using a suede polishing pad and silica abrasive grains. The curvature radius R of the R-faces was 1.8 µm.

After polishing the surface, a $Ta_2O_5$ film of 0.5 µm thick was formed on the surface of the waveguide by the sputtering. After the device was cut out with a length of 12 mm and a width of 1.4 mm by a dicer, the faces of both ends were polished. Thereafter, an anti-reflection coating was applied to both end faces of the device.

The optical characteristics of this waveguide was measured by using a semiconductor laser. The oscillation power output from the laser was adjusted to 100 mW, and the fundamental light was condensed on the end face of the waveguide by a lens; as the result, 85 mW was coupled to the waveguide. The wavelength of the semiconductor laser was varied by the temperature and was adjusted to a phase-matched wavelength; and as the result, the Secondary-Harmonic-Generation (SHG) output of 25 mW at the maximum was acquired. The wavelength of the fundamental light at that moment was 1061.2 nm.

The curvature radius R of the edge area was varied as shown in Table 1, and the SHG output was measured in the same manner as the above. The results are shown in Table 1.

TABLE 1

| Radius of Curvature "R" (um) | SHG Output (mW) |
| --- | --- |
| 0.0 | 11 |
| 0.5 | 11 |
| 0.7 | 21 |
| 1.0 | 24 |
| 1.3 | 25 |
| 1.5 | 26 |

TABLE 1-continued

| Radius of Curvature "R" (um) | SHG Output (mW) |
| --- | --- |
| 1.8 | 25 |
| 2.1 | 24 |
| 2.3 | 22 |
| 2.5 | 21 |
| 2.8 | 13 |
| 3.1 | 9 |

As shown in Table 1, the symmetry in the shape of the propagating mode was improved, by polishing the upper edge areas of the ridge waveguide to make the R-faces. As the result, the coupling efficiency was increased, the propagation loss was decreased, and the conversion efficiency was remarkably improved.

Incidentally, the R-face processing was not applied to the edge areas, and the C-faces were formed thereto, and the SHG output was measured in the same manner as above. As the result, the output was 11 mW.

The invention claimed is:

1. A wavelength conversion device comprising:
an optical waveguide substrate having a flat back face;
a ridge optical waveguide formed on a front face of said substrate and having a periodic domain inversion structure formed therein, said ridge optical waveguide comprising side wall faces, a flat upper face substantially parallel to said flat back face of said substrate, and edge areas formed between said flat upper face and said side wall faces, respectively, wherein said edge areas have a radius of curvature whose center of curvature "O" is present within said optical waveguide; and
a supporting substrate on which said optical waveguide substrate is bonded through an interposed adhesive layer.

2. The wavelength conversion device of claim 1, wherein said radius of curvature is 0.7 mm or more and is equal to or below ½ of the ridge width of said ridge optical waveguide.

* * * * *